United States Patent [19]

Rhynes

[11] 4,288,921
[45] Sep. 15, 1981

[54] ADJUSTABLE FISH SCORER

[76] Inventor: Oden H. Rhynes, 311 S. West Ave., Republic, Mo. 65738

[21] Appl. No.: 35,339

[22] Filed: May 2, 1979

[51] Int. Cl.³ .............................................. B26B 3/00
[52] U.S. Cl. ................................................... 30/304
[58] Field of Search ........................................ 30/304

[56] References Cited

U.S. PATENT DOCUMENTS

| D. 32,329 | 3/1900 | Irwin | 30/304 |
| 939,846 | 11/1909 | Matthews | 30/304 |
| 1,530,796 | 3/1925 | Thomsen | 30/304 |
| 1,814,528 | 7/1931 | Purcell | 30/304 |
| 2,232,321 | 2/1941 | Gibson | 30/304 |
| 2,594,932 | 4/1952 | Judelson | 30/304 |

FOREIGN PATENT DOCUMENTS

| 267554 | 6/1950 | Switzerland | 30/304 |
| 27751 | of 1911 | United Kingdom | 30/304 |
| 283458 | 1/1928 | United Kingdom | 30/304 |
| 1334383 | 10/1973 | United Kingdom | 30/304 |

Primary Examiner—Stephen G. Kunin
Assistant Examiner—J. T. Zatarga
Attorney, Agent, or Firm—Edward J. Cabic

[57] ABSTRACT

A scoring device which produces a plurality of cuts with a single pass comprises a handle and a body portion containing a movable blade holding assembly consisting of a series of razor blades mounted on a shaft with spacer elements between them. By loosening a thumb screw on the shaft the assembly can be released from a retracted noncutting position and slid out from the body portion to expose a greater amount of the blade edge which will produce a deeper cut. The assembly is then locked at the desired extended position with the thumb screw. The blades can be easily and economically replaced to maintain a sharp cutting edge and the device can be used to score fish.

8 Claims, 5 Drawing Figures

U.S. Patent  Sep. 15, 1981  4,288,921
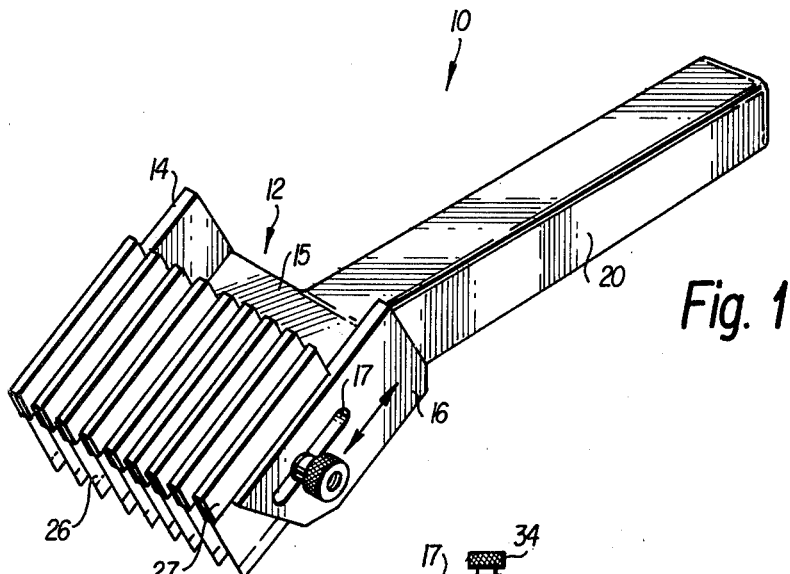
Fig. 1
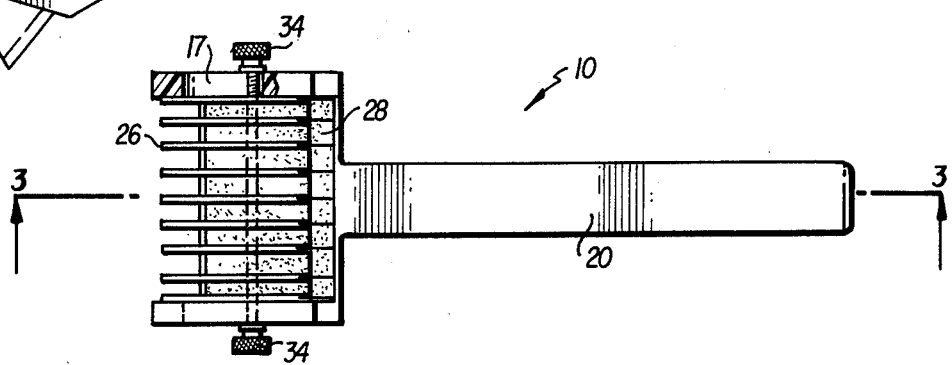
Fig. 2
Fig. 3
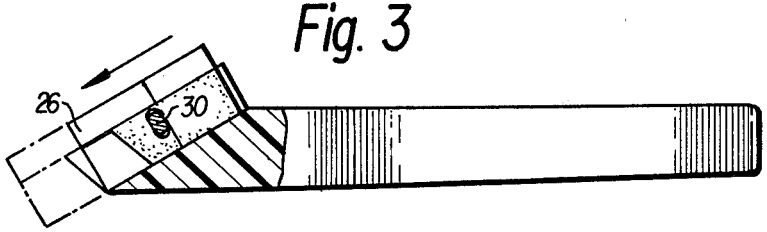
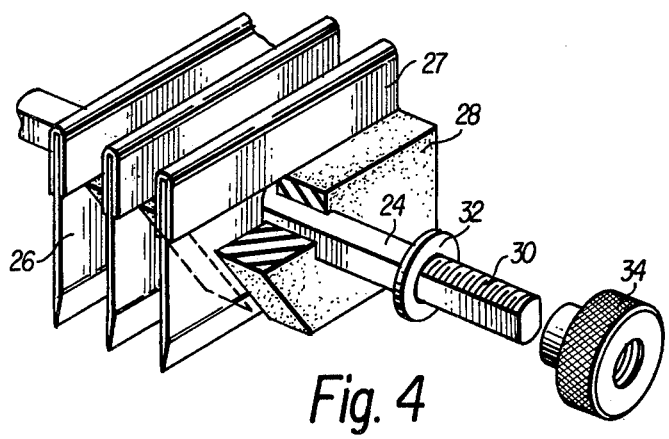
Fig. 4
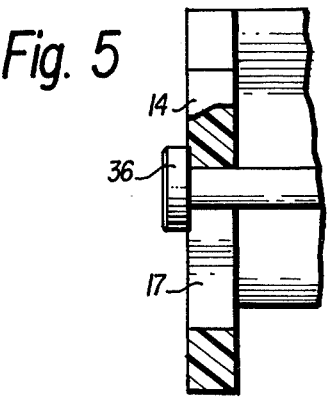
Fig. 5

ADJUSTABLE FISH SCORER

BACKGROUND OF THE INVENTION

1. Field of the Invention

This invention relates to a scoring device and a method of scoring fish utilizing this scoring device having a plurality of spaced apart retractable razor blades. The device is pulled across the fish so the blades produce a plurality of simultaneous cuts and the depth of the cuts can be controlled by adjusting the degree of extension of the sliding blade assembly.

2. Description of the Prior Art

Previously fish scoring was done with a knife having a single blade. To provide multiple cuts on both sides require passing the knife over each side of the fish many times. When a large number of fish are to be cooked for a fish fry, this scoring procedure requires a great deal of time and effort to make the many cuts at the same uniform depth.

SUMMARY OF THE INVENTION

A multiple blade type scoring device is provided for facilitating the cooking of small bony fish by severing the bones at several spaced apart lines with a single stroke of the cutting device thereby rendering them harmless and edible after cooking. The device may also be used to tenderize meat or to score any type of food.

The scoring of the fish surface and the bones increases the cooking area and allows the bones to cook, relieving the worry of choking while eating the fish.

An important object of the invention is to provide a scoring device having a plurality of cutting blades which are adjustable so that the cutting depth of the blades extending from the scorer can be adjusted within limits and so the blades can be withdrawn safely into the device when not in use.

A further object of this invention is to provide a scoring device which utilizes conventional type single edge safety razor blades which may be replaced economically. This avoids the need to frequently sharpen permanent type blades. The single edge type blades are preferred since they are not as fragile as double edge blades because of the supporting rib on the top of the blade. By virtue of this support and the construction of the body, the device may be used with safety under any force. The simple design also permits ease of disassembly for cleaning and for replacing the blades.

These together with other objects and advantages will become apparent from the details of construction and operation as herein fully described and claimed.

BRIEF DESCRIPTION OF THE DRAWINGS

FIG. 1 is a perspective view illustrating the scoring device made in accordance with this invention.

FIG. 2 is the top elevation view of the scoring device.

FIG. 3 is the side elevation view of the scoring device.

FIG. 4 is a partial view in perspective of the blades and their spacer elements supported on a support member.

FIG. 5 is a detailed drawing of the side of the device in one of the alternative embodiments.

DESCRIPTION OF THE PREFERRED EMBODIMENTS

Referring to the drawing in detail, FIG. 1 illustrates the scoring device 10 with a blade holding body section 12 made of a flat bottom surface 18 with two upwardly extending spaced parallel walls 14 and 16 and a handle 20 attached at an angle to the plane of the bottom plate 15. These components can be made separately and fastened together or they can all be molded into a single piece. A preferred embodiment is to have the unit made of a single molded piece of aluminum. Alternatively, it can be made of a high impact plastic.

The two walls 14 and 16 extend up from the bottom plate 15 forming an open area in the front and back. Each wall has an elongated slot 17 extending along the length of the wall in a direction parallel to the plane of the flat bottom. Positioned between the two walls and extending through the two slots is an adjustable blade holding assembly comprising a shaft 24 having a series of single edge safety razor blades mounted on the shaft with spacer elements 28 also mounted on the shaft between the blades. The shaft acts as a securing means for the blades and can have any cross-sectional configuration that corresponds to the openings in the blades. The shaft also must be able to pass through the elongated slots 17 in the walls. The preferred embodiment shown in FIG. 4 has a threaded rod with two sides milled or formed flat for the entire length. If the shaft is selected to have a non-circular configuration, then the ends of the shaft would at least have a threaded circular extension 20 which passes through the elongated slots 17 in each wall. Associated washer 32 fits over the shaft and thumb screw 34 screws on to the threaded portion on each end of the shaft to lock the shaft assembly against the walls and lock the blades in the desired cutting position. For sanitation reasons it is preferred that each thumb screw be threaded all the way through and not blind so that fish material does not build up inside the thumb screw. This also permits the thumb screw to lock on as tight as needed.

To disassemble the blade holding assembly to replace the blades, either one of the thumb screws can be unscrewed and the shaft pulled through the elongated slot in the opposite wall. As the shaft is pulled back through the wall the spacers and blades will become free. Similarly when new blades are to be added, the shaft is inserted through one of the walls and as it is pushed further and further through, the blades and spacer elements are alternatively passed over the free end of the shaft until the entire space between the two walls has been filled with these elements.

An alternative embodiment shown in FIG. 5 has one end of the shaft with a fixed bolt type end element 36 and the other end (not shown) which will have the threaded circular extension 30 and associated thumb screw 34 as shown in FIG. 4. When this blade holding assembly is to be dismantled for blade replacement, the thumb screw 34 is unscrewed and the bolt 36 is pulled to draw the shaft through the wall 14.

The spacer element can be made of rubber or of the same material as the body, and it can be made in a generally rectangular configuration with an opening through it corresponding to the cross-section of the shaft 24. In a preferred embodiment the spacer element extends down from the shaft further than the razor blades to insure that the bottom, cutting edges of the razor blades do not rub against the bottom surface 15 the spacers abut the bottom surface as shown in FIG. 3. The spacer elements can also be dimensioned so they fit snugly under the top rib of the single edge razor blade to further prevent any rotation of the blades about the shaft when any substantial pressure is exerted on the handle during use. In a preferred embodiment the blades and spacer elements are arranged inside the two walls so that a blade is adjacent each inner wall. The rib 27 of the blade is a U-shaped safety backing plate providing an edge on each side of the blade adjacent the blade edge opposite the cutting edge. This edge then rests on the top of the wall where the top of the wall supports the blade and further assists in preventing the blade assembly from rotating when substantial pressure is applied to the device.

The spacer element can have the front end curved inwardly or bevelled from top to bottom so that it has the same curved configuration or contour as the front end of side walls 14 and 16 shown in FIG. 1 with all of the front edges of the spacers aligned as shown in FIG. 4. The blades will still extend out about $\frac{3}{4}$ inch from the front of the spacer element.

The space between the walls 14 and 16, the thickness of the spacer elements 28, and the thickness of the razor blades are controlled accurately so a slight pressure on the thumb screw 34 will hold the sliding blade holding assembly in any desired cutting position or back in the retracted position shown in FIG. 2. By loosening the thumb screws the blade holding assembly can be positioned back and forth within the elongated slots 17 in the walls 14 and 16 so the razor blades 26 may be adjusted to any depth of cut from the maximum position to the retracted position. FIG. 1 and the dotted part of FIG. 3 illustrate an extended position while FIG. 2 and the solid portion of FIG. 3 illustrate the retracted position. Tightening the thumb screw at the desired position locks the blade holding assembly and thus fixes the cutting depth.

The handle 20 is held in the hand and used to apply force to the surface of the food item being scored to provide multiple cuts with a single pass.

I claim:

1. A razor blade holding device adapted for holding a plurality of parallel spaced, replaceable single edge razor blades, said device being adjustable for positioning and locking the cutting edges of the blades at various cutting depths when used for scoring fish and for safely retracting the blades to a position where no blade cutting edges are exposed when not in use comprising:
   a blade holding body having a planar, flat bottom surface and two upwardly extending spaced parallel side walls defining a front and back opening;
   a handle attached to said blade holding body;
   an elongated slot in each of said side walls having a longitudinal axis in a direction parallel to the plane of the planar, flat bottom;
   a plurality of single edge razor blades each having a bottom blade cutting edge and a U-shaped safety backing plate providing an edge on each side of the blade adjacent the blade edge opposite the cutting edge;
   blade securing means to secure (a) said plurality of single edge razor blades in a parallel, spaced apart relation between the two parallel side walls of the body and to maintain the blade cutting edges in approximately the same plane from the planar, flat bottom surface, said blade securing means comprising a blade support member extending between the elongated slots in both side walls with a slot extending element extending out through the slot in each side wall and a plurality of spacer elements slidably mounted on said support member between said side walls, said spacer elements being positioned between the razor blades and under the edge of the U-shaped safety backing plate of each blade with said spacer elements extending further down from the shaft toward the bottom surface than the blades and with said spacer elements abutting the flat bottom surface so as to prevent rotation of the blades about the shaft; and
   blade position locking means adjustably locking and unlocking the extending elements against the outer sides of the side walls whereby the blade support member can be positioned toward the front opening and locked in position so the razor blades will extend out past the planar, flat bottom surface for cutting and whereby the blade support member can be positioned toward the back opening and locked in this back position so the razor blades will be maintained back within the parallel side walls where the cutting edges of the blades are not available for cutting.

2. The device according to claim 1, wherein the side walls and spacer elements in the front of the device are bevelled and where the front edges of the bevelled spacer elements are aligned.

3. The device according to claim 1, wherein said blade securing means is positioned so the blade at each end of the blade securing means in contact with the side wall has the edge of its U-shaped safety backing plate snugly fitting on the top of the side wall to prevent rotation of the blades about the shaft.

4. The device according to claim 1, wherein the ends of the slot extending element are threaded and said blade position locking means comprises two thumb screws which screw on the threaded end portions of the slot extending element to lock each end portion against the outside surface of the two side walls.

5. The device according to claim 1, wherein one end of the slot extending element is threaded and said blade position locking means comprises a bolt head on the opposite end of the slot extending element engaging the outside surface of one side wall and a thumb screw which screws on the threaded end portion of the slot extending element to lock the opposite end portion against the outside surface of the other side wall.

6. The device according to claim 1, wherein the cross-section of (a) the support member between the parallel side walls and (b) the openings in the spacer elements is circular with a flat portion on two opposite sides.

7. The device according to claim 1, wherein the cross-section of the support member is non-circular and corresponds substantially to the configuration of a portion of the opening in a razor blade.

8. The device according to claim 7, wherein the cross-section of the support member is substantially rectangular.

* * * * *